United States Patent [19]

Grosvenor

[11] Patent Number: 4,964,071
[45] Date of Patent: Oct. 16, 1990

[54] METHODS AND APPARATUS FOR MEASURING TRANSVERSE DIMENSIONS OF WORKPIECES

[75] Inventor: Roger I. Grosvenor, Cardiff, Wales

[73] Assignee: National Research Development Corporation, London, England

[21] Appl. No.: 276,657

[22] Filed: Nov. 28, 1988

[30] Foreign Application Priority Data

Nov. 30, 1987 [GB] United Kingdom ............... 8728016

[51] Int. Cl.⁵ ............................................ G06F 15/46
[52] U.S. Cl. ................................ 364/560; 364/551.02
[58] Field of Search ............... 364/560, 563, 561, 562, 364/474.18, 474.37, 551.02; 33/555.1

[56] References Cited

U.S. PATENT DOCUMENTS

| | | |
|---|---|---|
| 3,136,069 | 6/1964 | Reason . |
| 3,259,989 | 7/1966 | Wilson . |
| 3,615,143 | 10/1971 | Barr et al. . |
| 3,992,615 | 11/1976 | Bennett et al. ................ 364/561 |
| 4,026,031 | 5/1977 | Siddall et al. ................ 364/560 |
| 4,516,212 | 5/1985 | Nagashima ................ 364/474.37 |
| 4,729,174 | 3/1988 | Caron et al. . |

FOREIGN PATENT DOCUMENTS

| | | |
|---|---|---|
| 0132947 | 2/1985 | European Pat. Off. . |
| 0177038 | 4/1986 | European Pat. Off. . |
| 0233683 | 8/1987 | European Pat. Off. . |
| 2464456 | 3/1981 | France . |
| WO8707007 | 11/1987 | PCT Int'l Appl. . |
| 2098329A | 11/1982 | United Kingdom . |
| 2197477 | 5/1988 | United Kingdom . |

OTHER PUBLICATIONS

Measurement Techniques, vol. 28, No. 2, Feb. 1985, pp. 136–139, New York, V. P. Bogdanov, et al.: "An Automatic Method of Determining the Parameters of Devices for Undulation Monitoring".

Primary Examiner—Parshotam S. Lall
Assistant Examiner—S. A. Melnick
Attorney, Agent, or Firm—Cushman, Darby & Cushman

[57] ABSTRACT

In computer control of machine tools there is a need to measure the diameters of cylindrical workpieces automatically and preferably without touching the workpiece. For this purpose an inductive proximity sensor is mounted for circular or linear movement along a path adjacent to a cylindrical workpiece and in a plane normal to a radius of the workpiece. A discrete fast Fourier transform (FFT) is carried out on the output of the sensor as it moves along the path and the amplitude of the second ac component of the FFT is an indication of the workpiece diameter. By calibrating with workpieces of different diameters, the said amplitude can be used as a measure of workpiece diameter.

29 Claims, 9 Drawing Sheets

METHODS AND APPARATUS FOR MEASURING TRANSVERSE DIMENSIONS OF WORKPIECES

The present invention relates to methods and apparatus for use with machine tools in measuring transverse dimensions of workpieces. The invention is particularly applicable to measuring the diameters of cylindrical portions of workpieces.

In computer numerical control (CNC) machine tools there is a need to measure the diameters of cylindrical portions of workpieces automatically and preferably without touching the workpiece. In addition it is useful to be able to measure such diameters while machining is being carried out and to allow for cutting forces and other disturbances which occur during machining.

According to a first aspect of the present invention there is provided a method of deriving a transverse dimension of an object comprising the steps of using a sensor to measure the distance between the surface and a datum, moving the sensor along a path near the object such that the said distance changes, repeatedly measuring the said distance, analysing the relationship between the distances measured and the position of the sensor in the path, and deriving an indication of the said dimension from the analysis.

The periphery of the object in the plane of the transverse dimension may have any shape but the indication obtained relates only to that part of the object adjacent to the said path. For shapes having one or more axes of symmetry it may be possible to infer that the indication applies to a larger part of the shape or the whole of it. For example if the object is star shaped in cross-section with several axes of symmetry and the path is adjacent to one complete point of the star, the dimensions of the whole cross-section can be inferred. If the cross-section is completely irregular, the indication obtained applies only to that part of the periphery adjacent to the path.

According to a second aspect of the present invention there is provided a method of deriving a dimension of an object transverse to an axis thereof, the object being of a type which has a surface which intersects a plane normal to the axis in a closed conical section or a regular polygon and the dimension being a dimension of the surface in the plane, the method comprising the steps of using a non-contacting sensor to measure the distance between the surface and the sensor, moving the sensor along a path in a plane which includes a line parallel to the said axis while the said distance is repeatedly measured, the path being at least at times at an angle to the said line, analysing, using a predetermined analytical method, the relationship between the distances measured and the position of the sensor in the path, and deriving an indication of the said dimension from the analysis and a previous calibration of the said dimension of at least one object of the said type in relation to the predetermined analytical method.

The closed conical section may be a circle or an ellipse.

According to a third aspect of the present invention there is provided apparatus for deriving a dimension of an object transverse to an axis thereof, the object being of a type which has a surface which intersects a plane normal to the axis in a closed conical section or a regular polygon and the dimension being a dimension of the surface in the plane, comprising means for mounting an object of the said type with its said axis in a predetermined position, a non-contacting sensor for measuring the distance between the sensor and the said surface of the object, means for moving the sensor along a path in a plane which includes a line parallel to the said axis of the said object while the said distance is repeatedly measured, the path being at least at times at an angle to the said line, and means for analysing, using a predetermined analytical method, the relationship between distances measured by the sensor and the position of the sensor in the path and for deriving an indication of the said dimension from the analysis.

The means for analysing may store a calibration of the said dimension of at least one object of the said type in relation to the predetermined analytical method and employ it in deriving the said indication.

The said dimension may be the diameter of a cylindrical surface (external or internal) of the object and the path may be a circle, with the plane of the circle containing a line parallel to the longitudinal axis of the cylindrical surface. Alternatively the path may be linear and then preferably at right angles to the said line. The predetermined analytical method may be that of the Fourier transform in the form, for example, of the fast Fourier transform (FFT) when, it has been found, the amplitude of the second alternating frequency component is related to the diameter of the cylindrical surface. Other methods of analysis such as the use of Walsh functions or Hadamard transforms may, it is believed, be alternatives to the Fourier transform.

An important advantage of the invention when applied to a cylindrical surface and using an FFT is that the derivation of the diameter derived is insensitive over a useful range to any offset between the axis of the cylinder and a normal either to the circular sensor path passing through the centre thereof or to the linear path passing through the mid-point thereof. As a result it is not necessary for a CNC machine tool to bring the normal into coincidence with the cylinder axis, provided the offset is not too great, and any change in offset which occurs while machining is being carried out due to cutting forces or other disturbances does not for most practical purposes make the diameter derivation inaccurate.

A single traversal of the sensor around the circular path or along the linear path produces two peak amplitudes of sensor response and if these peaks are of equal amplitude then the above mentioned offset is zero. When the peaks are not equal the ratio of the peak responses gives an indication of the size of the offset and therefore the apparatus may derive a measure of the peak ratio and use this measure to make a small correction to the derived cylinder diameter or to move the relative positions of the cylinder axis and the centre of the circular path to reduce the offset, or to establish a limit for the offset.

Where the workpiece is metal the sensor may be an inductive sensor but if the workpiece is formed of another material then other types of sensors such as capacitive, eddy current or acoustic sensors may be used. A further alternative is the pneumatic sensor in which a pressure inside a chamber is partly determined by proximity of an object (whose position is to be determined) to an exit orifice, a constant air pressure is applied to an entrance orifice and the chamber pressure is measured by a pressure sensor.

The invention also includes apparatus for using the method of the first aspect of the invention.

Certain embodiments of the invention will now be described by way of example with reference to the accompanying drawings in which.

Figure 1A:
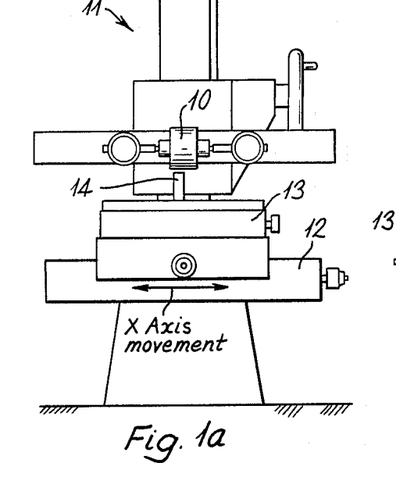
FIGS. 1(a), (b) and (c) show side elevations and a plan view of an exemplary machine tool configuration employing the invention.
Figure 1B:
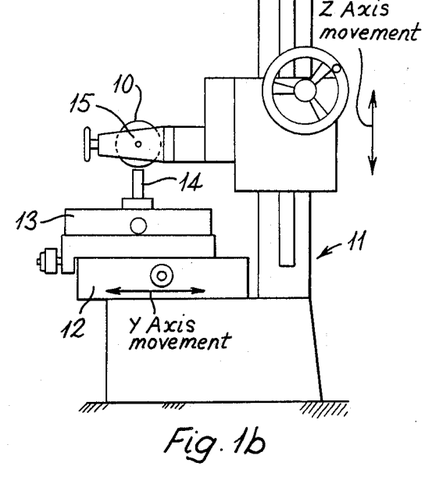
Figure 1C:
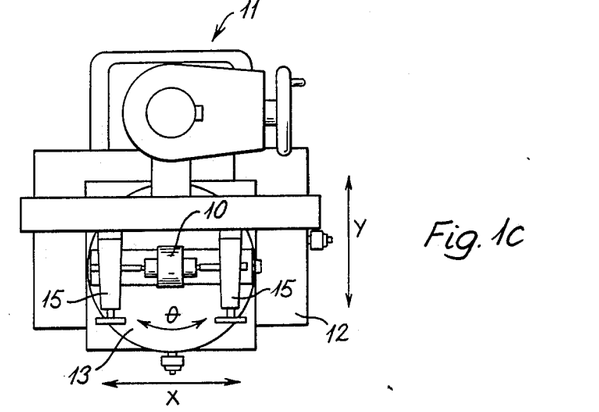

In FIGS. 1(a), (b) and (c) an object whose diameter is to be determined is represented by a cylinder 10 clamped between the centres of a machine tool 11 as a workpiece would be clamped in practice. The machine tool 11 has a bed 12 capable of X-Y axis movements as shown in FIGS. 1(a) and (b). The bed 12 carries a rotating stage 13 which rotates about the origin of the X-Y axes and on which is mounted an inductive sensor 14. The centres holding the cylinder 10 are mounted on support brackets 15 so that the cylinder can be moved in the Z axis direction shown in FIG. 1(b).

Figure 2:
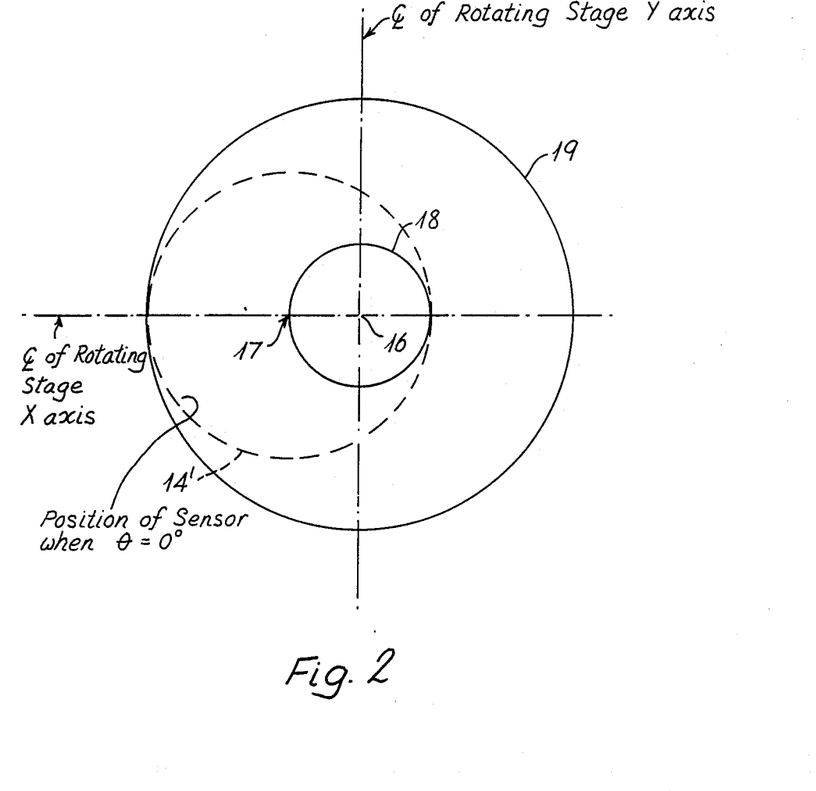
FIG. 2 shows the locus taken, in operation, by the axis of a sensor of FIG. 1 in relation to the centre of rotation of an X-Y axes rotating stage of the machine tool of FIG. 1.

The sensor 14 is mounted eccentrically with respect to the rotation of the stage 13 as shown in FIG. 2. The intersection of the X and Y axes of the bed 12 is shown at point 16 and the vertical axis of the sensor 14 is shown at point 17 for an angular position of 0° of the stage 13. The periphery of the sensor 14 in this angular position is indicated at 14'. In operation the stage is rotated and the locus of the point 17 and the envelope swept by the sensor 14 are indicated by circles 18 and 19 respectively. In practice for the range of cylindrical objects measured an eccentricity of 3 mm between the axis of the sensor 14 and the origin of the X and Y axes was found to be suitable so that the circle 18 has a diameter of 6 mm.

Figure 3:
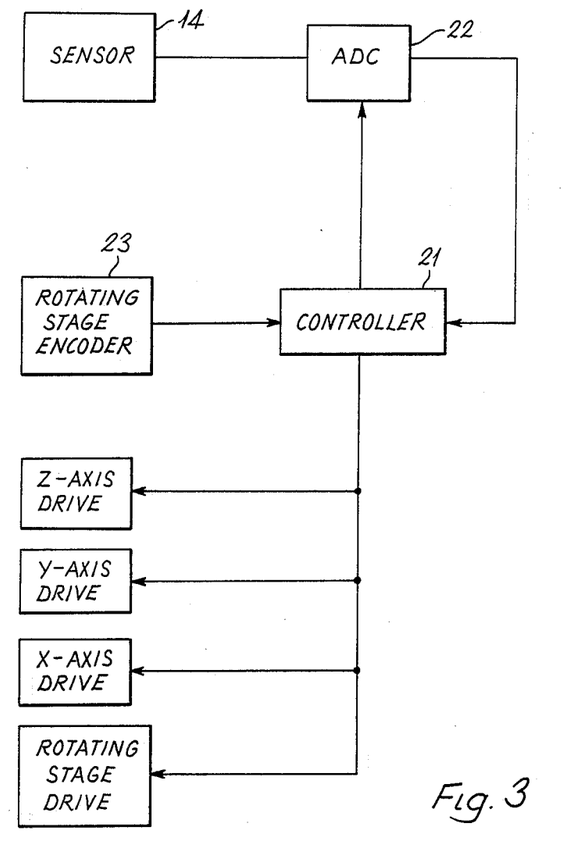
FIG. 3 is a block diagram of apparatus according to the invention.

The apparatus of FIGS. 1(a), (b) and (c) is under the control of a controller 21 shown in FIG. 3 where those functions of the controller which are relevant to this exemplary embodiment of the invention are also shown. The controller 21 includes a computer for machine control but has additional functions including, in this embodiment, carrying out an FFT.

Signals from the sensor 14 reach the controller by way of an analogue-to-digital converter (ADC) 22 and readout from the ADC is controlled by the controller.

The rotating stage 13 has an encoder 23 giving an output representative of the angular position in degrees of the stage, and the controller 21 controls X, Y, Z drives and a drive for the stage 13.

In operation the controller 21 adjusts the X and Y positions until the centre of the stage 13 is approximately below the axis of the cylinder 10 with cylinder axis parallel to the X axis. Then the angular position of the rotating stage 13 is set to zero with the sensor positioned so that the maximum gap (approximately) exists between the lowest portion of the cylinder 10 and the top of the sensor 14. Next the controller adjusts the Z axis position of the cylinder 10 until the digital output of the ADC shows that the working range of the sensor 14 will be utilised. When the type of sensor used is a Baumer electric type 1WA 12u 9002 together with a type C.I.L 6300 ADC a linear output is obtained for object distances in the range 1 mm to 1.5 mm corresponding to an ADC output of 20 to 2047. Thus the Z axis is adjusted until the ADC registers an output of 200, for example.

The controller now rotates the stage 13 and a series of ADC outputs is passed to the controller 21 with one output sent every 5° (for example) of rotation of the stage 13. Each output is initiated by the encoder 23 which causes an ADC readout to occur by way of the controller.

Figure 4:
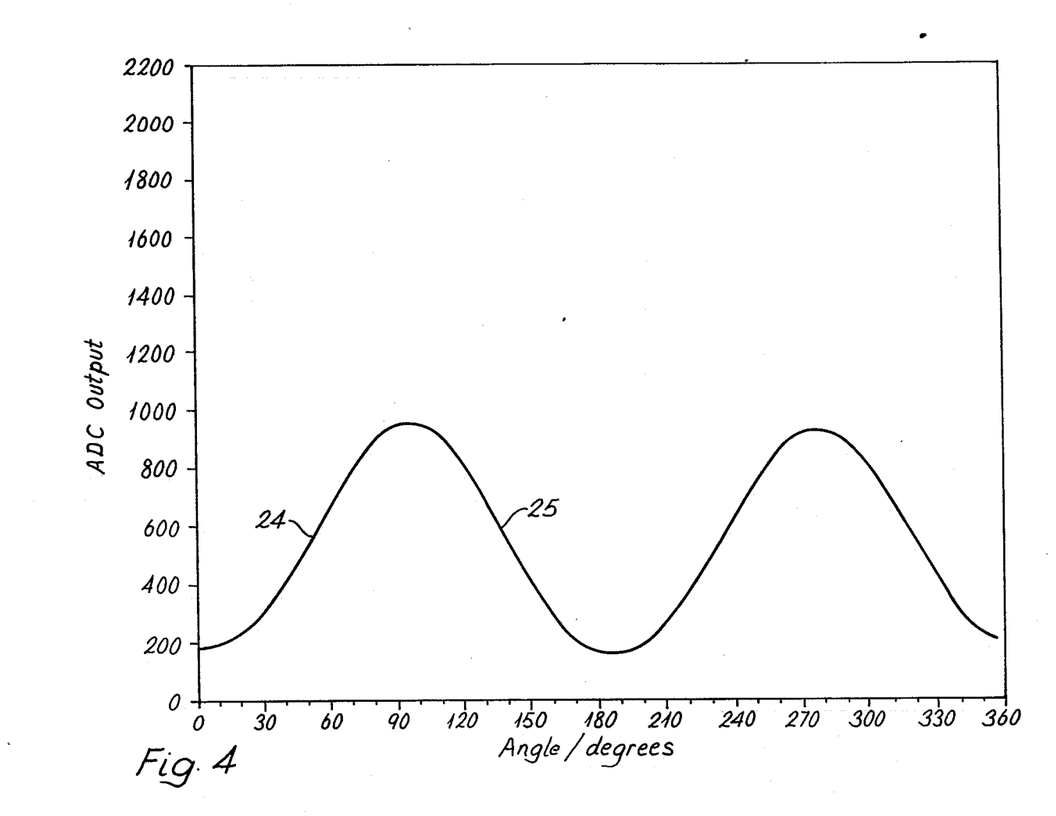
FIG. 4 is a graph of sensor output against angular position of the sensor when the offset between the sensor axis and the axis of a cylinder whose diameter is to be derived is very small.

The type of ADC output variation obtained with angular position of the stage 13 is shown in FIG. 4. As the position of the sensor 14 rotates with respect to the cylinder the distance between the top of the sensor 14 and the surface of the cylinder 10 gradually increases and the ADC output increases as is shown by the portion 24 of FIG. 4. When the angle of the stage reaches 90° this distance reaches a maximum value giving peak ADC output and then falls again, as indicated by the ADC output at 25, until the distance reaches a minimum value when the angle of the stage is 180°. As the stage is rotated through a further 180° to its original position the distance between the top of the sensor 14 and the surface of the cylinder 10 changes in the same way giving an ADC output which again rises to a maximum and falls to its original value.

FIG. 4 represents the ADC output when the axis of the rotating stage 13 intersects the axis of the cylinder; as a result the two peak ADC outputs are the same. Under these conditions it would be possible to deduce the diameter of the cylinder 10 from the amplitude of the sine wave shown in FIG. 4. However in practice, especially with computer controlled machine tools, it is difficult to ensure that the axis of the stage 13 and the cylinder axis intersect and an advantage of the present invention is that it is not necessary for these two axes to intersect provided the distance between the top of the sensor 14 and the surface of the cylinder 10 does not go much out of the linear range of the sensor 14.

Figure 5:
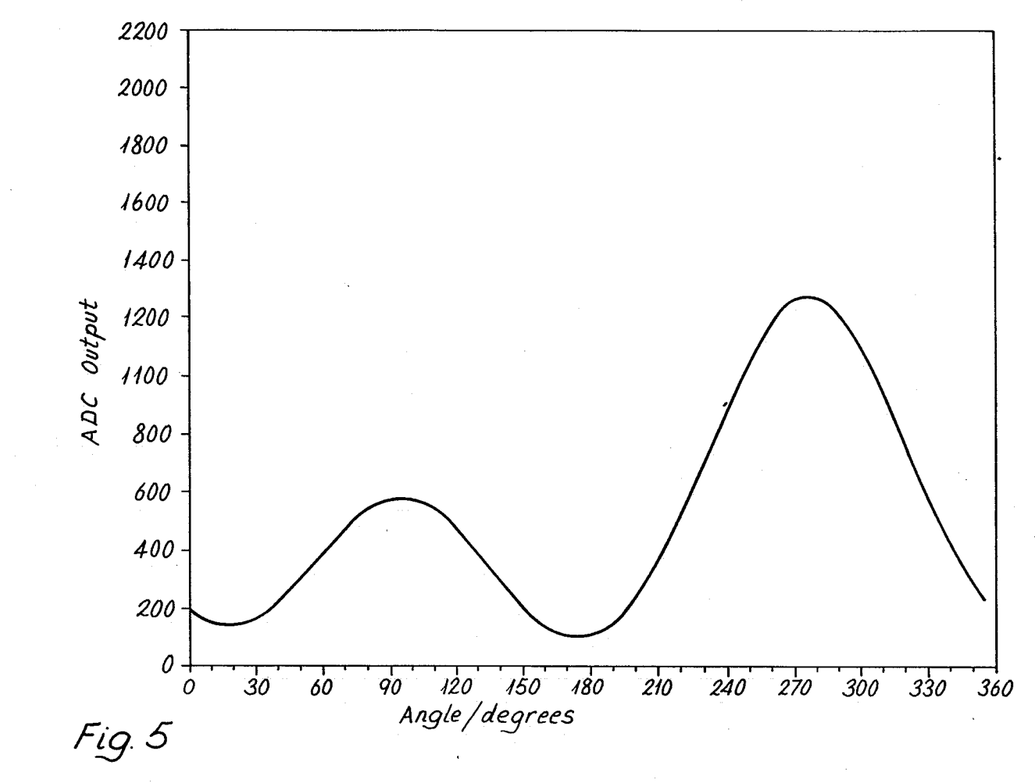
FIG. 5 is a graph of sensor output against angular sensor position when the above offset is pronounced.

The type of relationship of ADC output with angle of the stage 13 which is obtained when these axes are offset from one another by a horizontal distance is shown in FIG. 5 and by carrying out a Fourier transform on this relationship the diameter of the cylinder 10 can be accurately derived. In practice an FFT is carried out by the controller 21 and in a typical case for this embodiment thirty-six frequency components can be obtained and expressed in terms of real and imaginary components, amplitude and phase. However the number of components required to represent the relationship can be greatly reduced and even if only seven components are used the corresponding inverse transform provides a curve which fits the original shape reasonably well.

The frequency components given by the FFT can be designated as sin(nx), where there are n components with n=0 for the first component which corresponds to DC.

The largest amplitude component is the 2× component, that is the second ac component, which corresponds to the fundamental frequency of the shape of FIG. 4.

Figure 6:
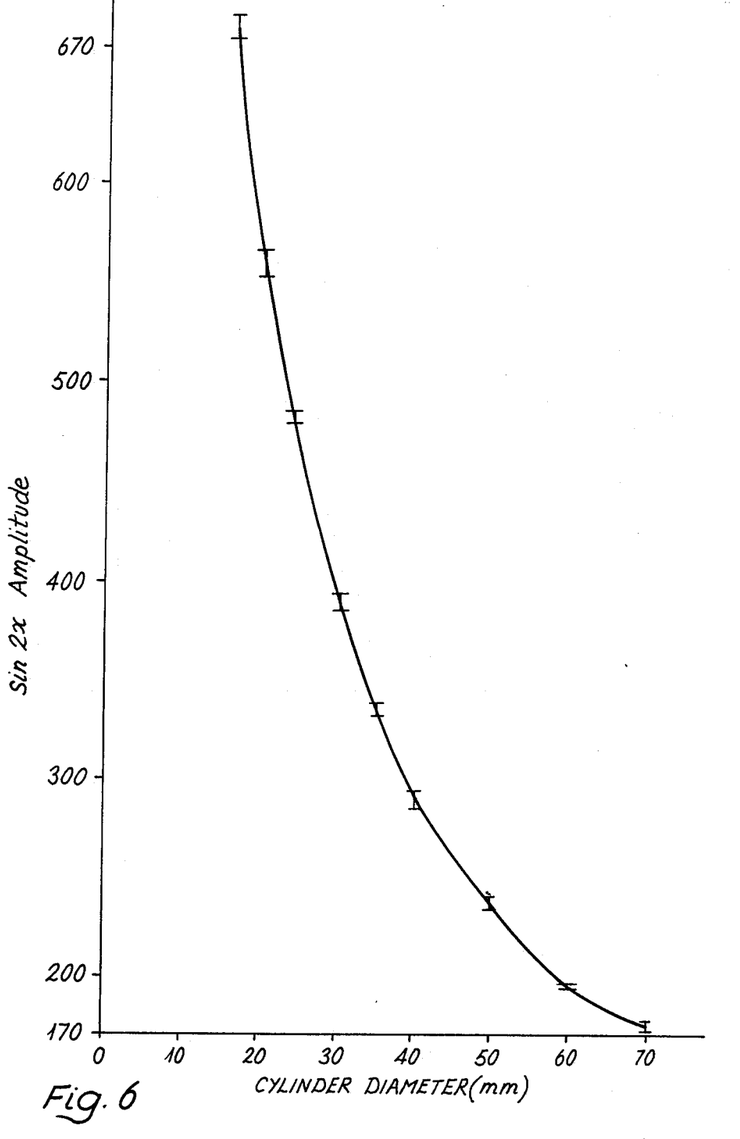
FIG. 6 is a graph of cylinder diameter against amplitude of the second ac component from an FFT for a method and apparatus according to the invention.

The present inventor has found that the diameter of the cylinder 10 can be derived accurately from the 2× component alone and the result obtained is insensitive to any reasonably small offset between the axis of rotation of the stage 13 and the axis of the cylinder 10. This result is illustrated in FIG. 6 where the amplitude of the 2× component is plotted against cylinder diameter. Each of the various ranges marked corresponds to a cylinder having one of the following different diameters: 16, 20, 24, 30, 35, 40, 50, 60 and 70 mm. Each range shown corresponds to axes offsets ranging from −0.58 to +0.66 mm.

The controller 21 is programmed to determine the amplitude of the 2× component of the FFT and this is used by means, for example, of an internal look-up table held, for example in a Read-Only memory, by the controller to give a direct indication of cylinder diameter.

Figure 7:
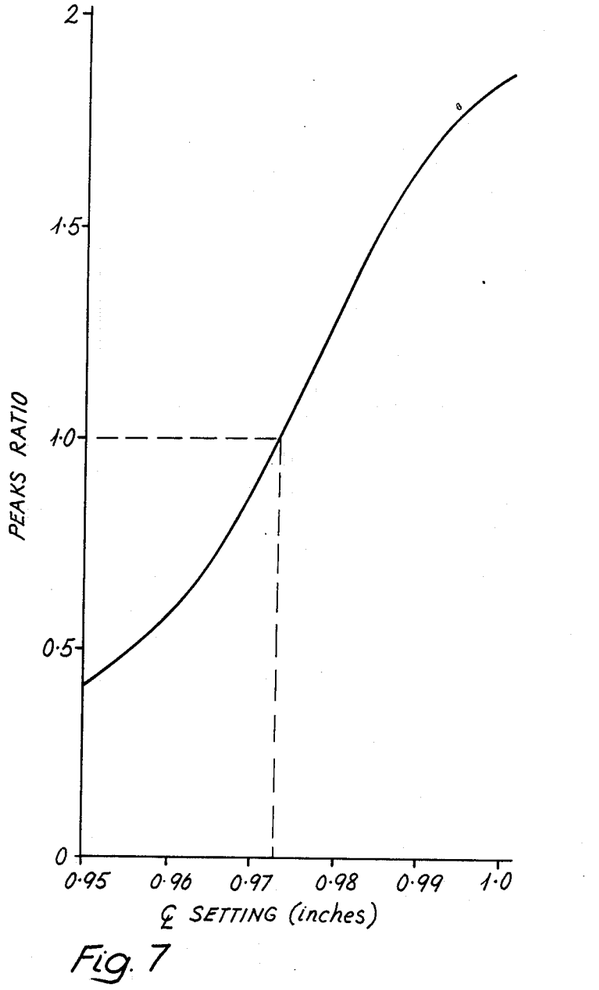
FIG. 7 is a graph of the above mentioned offset against the ratio of peaks obtained in the sensor output.

Should greater accuracy be required then the ratio of the two peaks of the ADC output can be used to determine the above mentioned offset between axes. If the peaks ratio is defined by $$\frac{\max 1 - \min}{\max 2 - \min}$$

where
"max 1" is the height of the first peak from a baseline,
"max 2" is the height of the second peak from the baseline, and
"min" is the height of the trough between the peaks from the baseline
then a graph of the form shown in FIG. 7 can be plotted. The vertical axis is the peaks ratio and the horizontal axis is a Y axis setting for the centre of rotation of the rotating stage 13. There is no offset at the peaks ratio of 1 and other offsets can be calculated in millimetres from the graph.

The controller 21 can be arranged to correct its output either by adjusting the Y drive until the peaks ratio is unity or by using a look-up table which takes account of the offset.

Before apparatus of the type shown in FIGS. 1(a), (b) and (c) and FIG. 3 is used, it is calibrated with a series of cylinders of known diameter to provide and store look-up tables, or an equation defining a power law, corresponding to a series of curves of the type shown in FIG. 6. Then the derived diameters of cylindrical objects clamped between the centres of the machine tool 11 depend on the sizes of these standard cylinders and the calibration curves obtained.

In practice machine tool 11 may be used to cut a cylindrical portion of an object and then the sensor 14 is moved into position so that the computer 22 provides an indication of the diameter of the cylindrical portion. Alternatively, the sensor 14 may be in position while cutting is carried out when an accurate derivation of diameter is obtained in spite of displacements and other disturbances which occur during cutting.

An alternative and preferred embodiment of the invention which uses linear motion for the sensor is now described. Linear motion produces outputs similar to those of FIGS. 4, 5 and 6, except that in FIGS. 4 and 5 the X-axis is measured in units of linear displacement rather than degrees.

Figure 8:
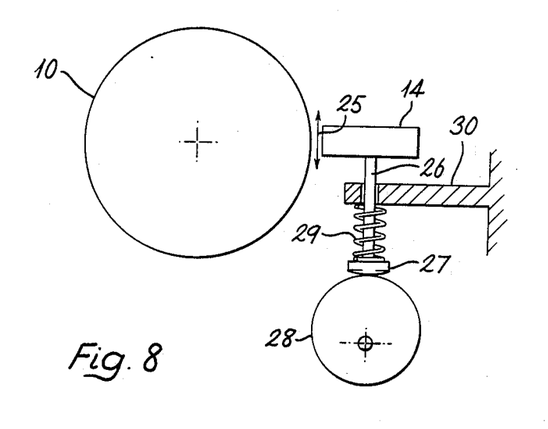
FIG. 8 shows a cam and slider assembly for imparting linear motion to a sensor.

In FIG. 8 the sensor 14 is mounted on a cam and slider assembly to produce oscillatory linear motion in the direction of the double headed arrow 25 at right angles to the axis of the cylinder 10 whose diameter is to be measured. The sensor 14 is mounted by means of a rod 26 on a cam follower 27 which is held in contact with a cam 28 by a spring 29 between the follower 27 and a fixed abutment 30.

Figure 9:
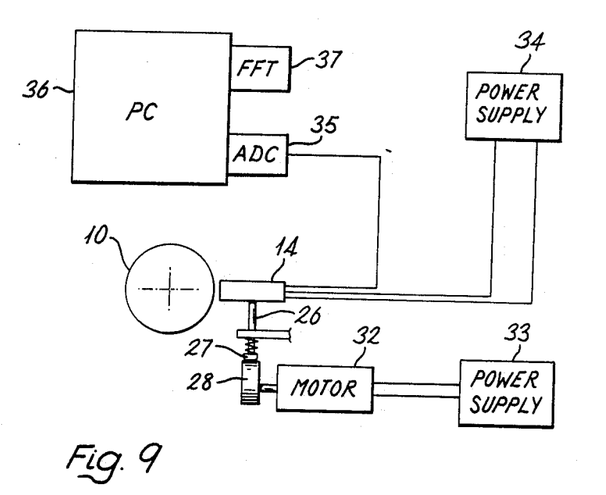
FIG. 9 is an electrical block diagram for use with the arrangement of FIG. 8.

A block diagram of an arrangement for measuring the diameter of the cylinder 10 without involving control of a machine tool is shown in FIG. 9. An electric motor 32 drives the cam 28 and is itself supplied from a power supply 33. The sensor 14 has a further power supply 34 and its output is connected to an analogue to digital converter board 35 plugged into a personal computer (PC) 36. An additional processor board 37 also plugged into the PC 36 carries out the discrete FFT. A suitable computer is the Opus PC II and the two processor boards 35 and 37 may be a type DT2814 and an ARIEL FFT processor, respectively.

It has been found preferable to take all data points from the sensor output for the FFT over one cycle of oscillation and it follows from the speed of operation of the ADC that the maximum linear oscillation frequency required is about 1 Hz. The motor 32 is chosen as appropriate for this requirement and the ADC and motor are synchronised to provide one cycle of data points from each linear oscillation of the sensor.

The PC 36 is programmed to take 512 samples from the sensor 14 and store them in a data array ZR (not shown). A data repositioning routine sorts through the stored data points sequentially until a point is found which is both midway between the maximum and minimum and on a positive slope. The array is then reorganised to give one full cycle (256 points) starting at this midpoint to ensure that the same starting point is used for each execution of the FFT and hence maintain a consistent arrangement. The reorganised 256 points are stored in the same data array ZR in locations 0 to 255. The data points making up the sensor output wave are then shifted so that the wave is symmetrical about the X-axis and the data points forming this shifted wave are stored in a data array RD, again in locations 0 to 255. This removes the dc term and allows the samples to be amplified to the maximum extent so making full use of the FFT board. The FFT processor reads from the data array RD (not shown) and passes its output to two further data arrays RFT and IFT (not shown), each of 256 points, and representing real and imaginary values, respectively. The data arrays are stored in the PC 36.

When the FFT function is called, the output generated consists of n terms, where n has the meaning given above, each having real and imaginary parts which appear in locations RFT(n) and IFT(n). From 256 data points 128 terms are generated. To obtain the amplitude of the $n^{th}$ component the square root of the sum of the squares of RFT(n) and IFT(n) is taken; for example the amplitude of the 2× component is obtained from the square root of the sum of the squares of RFT(2) and IFT(2).

Figure 10:
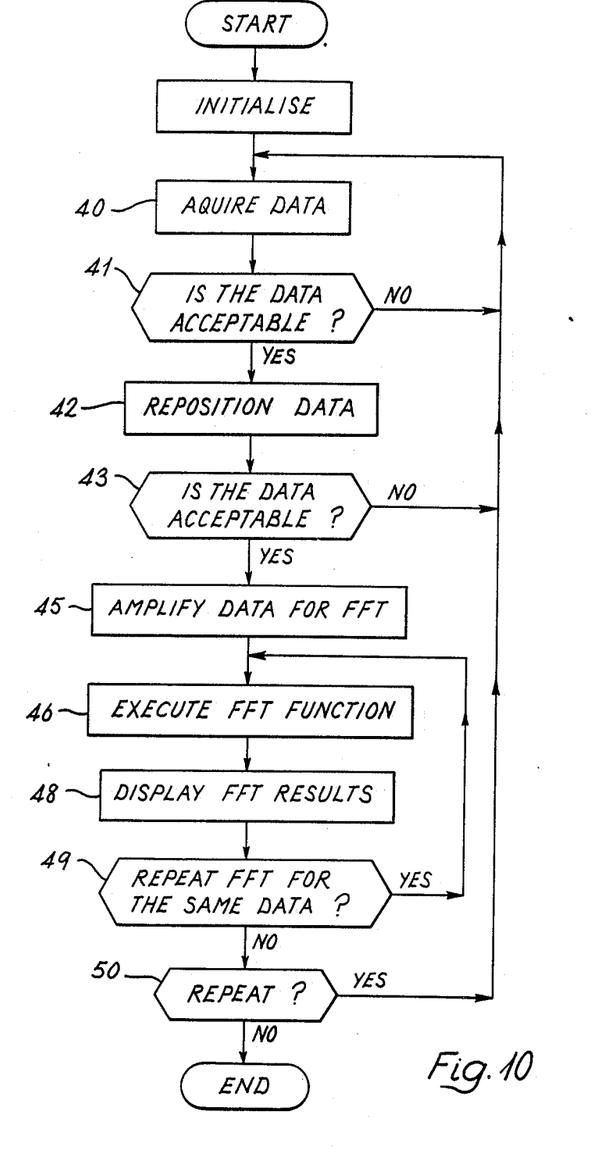
FIG. 10 is a flow chart of a program employed by the computer of FIG. 9.

A flow chart of the program followed by the PC 36 is given in FIG. 10. After initialising the PC a data acquisition routine is run in an operation 40 and when completed the data is positioned in locations 0 to 255 of the array ZR, as mentioned above. If the data acquired is acceptable according to a test 41 then it is repositioned in the data array RD with the wave represented symmetrically about the X-axis as mentioned above in an operation 42. The test 41 can be based on a visual inspection of plotted data points on the screen of the PC 36, or automatically by ensuring that the last data point is the same as the first, as it should be if the motor 32 and the ADC 35 are correctly synchronised. After another test 43 which is the same as the test 41, the date is amplified in an operation 45 by multiplication of each data point by a constant having a value which makes full use of the capabilities of the FFT board and then the FFT subroutine is run (operation 46). An operation 48 follows in which the FFT results are displayed on the screen of the PC 36. An operator controlled test 49 follows to allow the FFT to be repeated for the same data and then a test 50 allows the whole operation of acquiring data, repositioning, amplifying and executing FFT functions to be repeated as required.

The displayed results can be used either manually or as part of the PC program to calculate the workpiece diameter from previously obtained calibration tables or graphs available to an operator and/or stored in the PC.

Although the method of measurement does not require the mean position of the sensor to be on that radius of the cylinder 10 which is at right angles to the linear movement, the second harmonic term does vary slightly with offset from this position and so to preserve the accuracy of the method the offset should be kept within certain limits. The peaks ratio (mentioned above) can be used to indicate the maximum offset which should be allowed. In practice it has been found that if the peaks ratio is not allowed to rise above 1.1 then an acceptable accuracy of measurement is obtained. For example the maximum error with a 12 mm diameter cylinder is ±0.008 mm and this increases to ±0.062 mm for a 70 mm diameter cylinder. This variation in the maximum error is mainly due to the change in the sensitivity of the method with diameter; that is the same change in the second ac term has a larger effect on the estimated diameter as the cylinder diameter increases.

The sensor may be mounted on a rod supported at one end and vibrated at its natural frequency as an alternative to the cam and slider arrangement. The movement obtained is then along an arc but is a close approximation to linear movement. Preferably the movement is damped so that it is less sensitive to changes in operating conditions, and the centre of the arc should be in the null offset position, or as near as is allowed by the peaks ratio limit. Also a tangent to the arc should be at right angles to a radius of the cylinder 10.

It will be appreciated that the invention can be put into practice in many other ways than those specifically described, particularly in the analysis carried out on the relationship between the angle of the rotating stage and the ADC output.

I claim:

1. A method of deriving a dimension of an object transverse to an axis of the object and at least partly defined by a surface of the object, the method comprising the steps of:
    moving a non-contacting distance-measuring sensor along a predetermined path while repeatedly measuring a distance between said surface and the sensor, said path being substantially within a predetermined plane orthogonal to a line which intersects said axis orthogonally and the path being, at least at times, at an angle to a line in said plane which is parallel to said axis,
    analyzing, using a predetermined analytical method, a relationship between distances measured and a position of the sensor in the path, and
    deriving an indication of said dimension from the analyzing and from a previous calibration relating analysis carried out by the predetermined analytical method to a known dimension normal to said plane for sensor movement along said path.

2. A method according to claim 1 wherein the predetermined analytical method comprises the use of a fast Fourier transform to analyze a signal representative of the distances measured by the sensor.

3. A method according to claim 2 wherein the surface is a surface of a cylinder and the said dimension is a diameter of the surface, and the diameter of the surface is derived from an amplitude of a second ac component of the fast Fourier transform.

4. A method according to claim 3 wherein the said calibration is of the said second ac component versus the diameters of cylindrical surfaces.

5. A method according to claim 1 wherein the path is circular.

6. A method according to claim 5 wherein, in operation, the peak magnitudes of the output of the sensor in one traversal of the path are compared to give a signal representative of the offset distance between the normal to the path at the centre thereof and the said axis.

7. A method according to claim 6 wherein, in operation, the said signal is used to reduce the said offset.

8. A method according to claim 6 wherein the surface is cylindrical and the said dimension is the diameter of the surface, and, in operation, the said signal is used in deriving the diameter of the cylindrical surface.

9. A method according to claim 6 wherein the said signal is used to indicate a maximum offset which is permitted in operating the method.

10. A method according to claim 1 wherein the path is linear.

11. A method according to claim 10 wherein the path is at right angles to the said line.

12. A method according to claim 10 wherein, in operation, the peak magnitudes of the output of the sensor in one traversal of the path are compared to give a signal representative of the offset distance between the normal to the path at the centre thereof and the said axis.

13. A method according to claim 12 wherein, in operation, the said signal is used to reduce the said offset.

14. A method according to claim 12 wherein the said signal is used to indicate a maximum offset which is permitted in operating the method.

15. An apparatus for deriving a dimension of an object transverse to an axis of the object and at least partly defined by the surface of the object, comprising:
    means for mounting an object with an axis thereof transverse to a dimension to be measured in a predetermined position,
    a non-contacting sensor for measuring a distance between the sensor and a surface of the object which at least partly defines said dimension,
    means arranged to move the sensor along a predetermined path while repeatedly measuring the distance between said surface and the sensor, said path being substantially within a predetermined plane orthogonal to a line which intersects said axis orthogonally and said path being, at least at times at an angle to a line in said plane which is parallel to said axis, and means for analyzing, using a predetermined analytical method, a relationship between distances measured by the sensor and a position of the sensor in the path and for deriving an indication of said dimension from said analyzing.

16. Apparatus according to claim 15 wherein the means for analyzing stores a calibration relating analysis carried out by the predetermined analytical method to a known dimension normal to said plane for sensor movement along said path and also employs the calibration in deriving the said indication.

17. Apparatus according to claim 15 wherein the sensor is an inductive distance measuring sensor.

18. Apparatus according to claim 15 wherein the surface is cylindrical and the said dimension is the diameter of the surface.

19. Apparatus according to claim 18 wherein the predetermined analytical method comprises the use of the fast Fourier transform and the diameter of the cylindrical surface is derived from the amplitude of the second ac component of the fast Fourier transform.

20. Apparatus according to claim 19 wherein the said calibration is of the said second ac component versus the diameters of cylindrical surfaces.

21. Apparatus according to claim 15 wherein the path is circular.

22. Apparatus according to claim 21 wherein, in operation, the peak magnitudes of the output of the sensor in one traversal of the path are compared to give a signal representative of the offset distance between the normal to the path at the centre thereof and the said axis.

23. Apparatus according to claim 21 including a rotatable member mounted for rotation in said plane, the sensor being mounted eccentrically on the rotatable member.

24. Apparatus according to claim 23 wherein the apparatus is a machine tool comprising a table arranged for movement along two orthogonal axes, and the rotatable member comprises a rotating stage mounted on the table, wherein the means for mounting an object comprises means defining two centres between which, in operation, a workpiece is mounted and the machine tool also comprises means for moving the centres at right angles to the surface of the stage, the sensor being mounted on the stage eccentrically in relation to the centre of rotation thereof.

25. Apparatus according to claim 24 including a controller for reading out the sensor in response to rotation of the stage and simultaneously applying to the means for analysing both the output of the sensor and a signal representative of the angular position of the stage.

26. Apparatus according to claim 25 wherein the controller also controls drives for the table, the stage and the means for moving the centres.

27. Apparatus according to claim 15 wherein the path is linear and at right angles to the said line.

28. Apparatus according to claim 27 wherein, in operation, the peak magnitudes of the output of the sensor in one traversal of the path are compared to give a signal representative of the offset distance between the normal to the path at the centre thereof and the said axis.

29. Apparatus according to claim 27 including a motor driven cam and a cam follower, the sensor being mounted to the cam follower to follow the said linear path.

* * * * *